US 9,352,642 B2

(12) United States Patent
Fogarty

(10) Patent No.: US 9,352,642 B2
(45) Date of Patent: May 31, 2016

(54) VEHICLE SUN COVER

(71) Applicant: Scott B. Fogarty, Gilbert, AZ (US)

(72) Inventor: Scott B. Fogarty, Gilbert, AZ (US)

(*) Notice: Subject to any disclaimer, the term of this patent is extended or adjusted under 35 U.S.C. 154(b) by 0 days.

(21) Appl. No.: 14/514,105

(22) Filed: Oct. 14, 2014

(65) Prior Publication Data

US 2016/0101678 A1   Apr. 14, 2016

(51) Int. Cl.
*B60J 11/00* (2006.01)
*B60J 11/04* (2006.01)
*E04H 15/06* (2006.01)
*B60J 7/10* (2006.01)

(52) U.S. Cl.
CPC .............. *B60J 11/04* (2013.01); *E04H 15/06* (2013.01); *B60J 7/102* (2013.01); *B60J 11/00* (2013.01)

(58) Field of Classification Search
CPC ............ B60J 11/00; B60J 11/04; B60J 11/06; B60J 7/102; B60J 7/104; E04H 15/06
USPC ........ 160/370.21; 296/136.01, 136.1, 136.12, 296/136.13; 135/88.01, 88.05, 88.07, 135/88.13, 88.14, 88.15, 88.16
See application file for complete search history.

(56) References Cited

U.S. PATENT DOCUMENTS

| | | | | |
|---|---|---|---|---|
| 2,942,794 A * | 6/1960 | Huso | ........................ | B60J 11/00 135/115 |
| 2,984,249 A * | 5/1961 | Sears, Jr. | ................. | A45B 11/00 135/114 |
| 3,095,034 A * | 6/1963 | Francis | ..................... | B60J 11/08 160/369 |
| 3,763,908 A * | 10/1973 | Norman | ................... | B60J 11/00 150/166 |
| 4,216,989 A * | 8/1980 | Tackett | ..................... | B60J 11/00 150/166 |
| 4,351,557 A * | 9/1982 | Chary | ........................ | B60J 3/06 296/97.7 |
| 4,805,654 A | 2/1989 | Wang | | |
| 5,090,469 A * | 2/1992 | Boulanger | ............. | A47H 23/01 160/354 |
| 5,388,883 A | 2/1995 | Yang | | |
| 5,795,012 A | 8/1998 | Liou et al. | | |
| 5,816,310 A * | 10/1998 | Wu | .......................... | B60J 11/06 160/370.21 |
| 5,921,259 A | 7/1999 | Ehler | | |
| 6,012,759 A | 1/2000 | Adamek | | |
| 6,095,230 A * | 8/2000 | Mitchell | ................ | B60J 1/2091 160/370.21 |
| 6,116,256 A * | 9/2000 | Pawsey | .................. | A45B 19/00 135/120.3 |
| 6,168,225 B1 * | 1/2001 | Deng | ....................... | B60J 11/00 296/136.04 |
| 6,192,967 B1 | 2/2001 | Huang | | |
| 6,357,461 B1 * | 3/2002 | Chai | ...................... | B60J 1/2011 135/117 |
| 6,536,827 B2 * | 3/2003 | Oswald | ................. | B60R 13/011 296/39.1 |
| 6,561,257 B2 * | 5/2003 | Huang | ................... | B60J 1/2091 160/134 |
| 6,568,737 B1 * | 5/2003 | Li | ............................ | B60J 11/00 160/370.21 |

(Continued)

*Primary Examiner* — Blair M Johnson
*Assistant Examiner* — Johnnie A Shablack
(74) *Attorney, Agent, or Firm* — Mark V. Loen

(57) ABSTRACT

The embodied invention is a large, horizontal sunshade with vertical shading curtains around the perimeter that is securely attached to the roof of a vehicle. The attachment means comprises a semi-permanent magnetic vehicle mount assembly that is attached to the vehicle roof and a matching snap ring that secures the sunscreen in place. The snap ring is magnetically attached to the car mount assembly using strong magnets that prevent the sunscreen from blowing away in the event of a wind. The sunscreen assembly incorporates reinforcing ribs in a way that allows the sunscreen assembly to be folded and stored compactly. The sunscreen assembly is removable by a simple rotation.

3 Claims, 6 Drawing Sheets

(56) References Cited

U.S. PATENT DOCUMENTS

| | | | | |
|---|---|---|---|---|
| 6,904,923 B2* | 6/2005 | Chai | B60J 1/2011 | 135/21 |
| 6,935,674 B1* | 8/2005 | Campos | B60J 11/00 | 296/136.1 |
| 7,008,002 B2* | 3/2006 | Rhea | B60J 11/06 | 280/848 |
| 7,090,282 B2* | 8/2006 | Li | B60J 11/00 | 150/166 |
| 7,150,306 B2* | 12/2006 | Ghazali | B60J 11/00 | 135/88.07 |
| 7,337,793 B2* | 3/2008 | Chen | B60J 11/02 | 135/117 |
| 7,562,928 B1* | 7/2009 | Morazan | B60J 11/00 | 296/136.01 |
| 7,604,016 B2* | 10/2009 | Songest | E04H 15/40 | 135/117 |
| 7,789,097 B1* | 9/2010 | Sotirkys | E04H 15/06 | 135/88.01 |
| 8,567,423 B1* | 10/2013 | Combs, Jr. | E04H 15/32 | 135/120.3 |
| 8,651,555 B2* | 2/2014 | Chan | B60J 11/04 | 150/166 |
| 8,960,212 B2* | 2/2015 | Majer | B60J 11/00 | 135/88.07 |
| 2002/0139403 A1 | 10/2002 | Shi | | |
| 2003/0070774 A1* | 4/2003 | Li | B60J 11/08 | 160/370.21 |
| 2005/0121937 A1* | 6/2005 | Hudgins | B60J 11/00 | 296/98 |
| 2005/0242610 A1 | 11/2005 | Galindo | | |
| 2006/0000529 A1 | 1/2006 | Le | | |
| 2006/0214465 A1* | 9/2006 | Chau | B60J 11/00 | 296/136.1 |
| 2007/0215298 A1* | 9/2007 | Chen | B60J 11/00 | 160/370.21 |
| 2009/0072578 A1* | 3/2009 | Wang | B60J 11/06 | 296/136.12 |
| 2014/0020799 A1* | 1/2014 | Gridley | B60J 11/00 | 150/166 |
| 2015/0047797 A1* | 2/2015 | Weyer | B60J 11/08 | 160/370.21 |
| 2015/0151623 A1* | 6/2015 | Li | B60J 11/08 | 160/370.21 |
| 2015/0202952 A1* | 7/2015 | Karboul | B60J 11/00 | 150/166 |

* cited by examiner

VEHICLE SUN COVER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed toward sunshades and sunscreens useful for protecting a vehicle from the sun's rays. It is particularly directed toward external sunscreens attached to the roof or top of a vehicle.

(2) Description of Related Art

Internal sunscreens are a popular way to lower the internal temperature of a vehicle that is parked in the sun. The screens are typically installed just behind the front windshield and provide a way to keep the dashboard, steering wheel, and front seats from being too hot for a person to enter and sit down to operate the vehicle. The reduction in heat in the front of a vehicle provides for a faster cool down when the air conditioner is used, as the system does not have to cool down air conditioning ductwork first. Also, the vehicle driver can usually hold the steering wheel which can be too hot to comfortably touch when the sun directly shines on it.

The internal sunscreens fold into a compact shape such as by an accordion method, rolling up, or folding. This makes it convenient to store in the vehicle by setting it aside on the back seat or other area.

Internal sunscreens provide only a measure of protection from heating the vehicle interior. They are usually designed for the front windshield, and do not completely put the interior in a shady condition. A casual observation of parking lots in the southwest (where the sun in more intense) shows that it is desirable to obtain more complete shading. Vehicles are intentionally parked under shades from trees to obtain additional sun protection and lower the interior temperature, even though it may require a longer walk to a store or place of business.

Additionally, the sun will move and the effectiveness of a windshield sunscreen will be reduced when the sun's rays come in through the side windows of the vehicle.

Others have attempted to provide sunshades and external umbrellas for vehicles. For example US 20050242610 describes a sun cover that is magnetically attached to a car roof to cover all the vehicle windows. However, a fitted cover is needed for each car type in order for the magnetic attaching system to work. A single cover design that will shade a wide variety of vehicle models is not practical.

U.S. Pat. No. 6,012,759 describes a relatively permanent attachment on the vehicle roof that provides a pull out shade for the vehicle. This option is less desirable as the externally attached cover has a number of mechanical parts that will be exposed to the weather making reliability questionable. Also, there is no provision for shading side windows.

One embodiment of US20020139403 describes a center pole mount for a vehicle umbrella. This style of vehicle shade is less desirable as the umbrella is subject to wind and only provides shade for part of the vehicle. The other embodiment uses multiple attaching points.

U.S. Pat. No. 4,805,654 describes a rectangular sun shade with telescoping poles. The telescoping poles are not convenient to utilize and are awkward to collapse and store the shade in a compact space. The pole mount is unattractive and utilitarian, and fails to provide any sort of aesthetic appeal. Also, the shape of the shade does not provide for shading when the sun is at a low angle.

U.S. Pat. No. 5,795,012 describes a sun shade that is installed on top of a center mount. The center mount includes reinforcing ribbing for the sun shield that is permanently attached. This makes the installation of the shield is awkward and time consuming. Also, the deployment mechanisms used are overly complex for the simple need.

Successful external sunscreens are more difficult to effectively design then the interior ones, as seen by a lack of common use in the marketplace. Important matters of convenience have not been addressed in current designs. An external shade should be convenient and quick to install, it should be storable in a compact manner, any permanent mounting structure should have some aesthetic appeal, and it should provide a complete shading of the interior. It is also desirable for the sun shade to be built and designed at an affordable price.

BRIEF SUMMARY OF THE INVENTION

The embodied invention is an external vehicle sun cover assembly using a large, sun screen assembly that is securely attached to the roof of a vehicle via a vehicle mounting assembly. Vertical shading curtains are included around the perimeter of the sun screen assembly. The attachment means comprises a semi-permanent magnetic vehicle mounting assembly that is attached to the vehicle roof and a matching clamp ring that secures the sunscreen in place. The clamp ring is magnetically attached to the car mount assembly using strong magnets that prevent the sunscreen from blowing away in the event of a wind. The sunscreen incorporates reinforcing ribs in a way that allows the sunscreen to be folded and stored compactly. The clamp ring releases the sunscreen by a simple rotation.

BRIEF DESCRIPTION OF THE SEVERAL VIEWS OF THE DRAWING(S)

FIG. 3B is view BB of FIG. 3A.

DETAILED DESCRIPTION OF THE INVENTION

As already stated, the embodied sunscreen assembly is attached to the top of the vehicle roof via a magnetic vehicle mounting assembly. The bottom surface of the attaching assembly is preferable a non-marring surface such as plastic, a rubber, or a padded surface.

Figure 1:
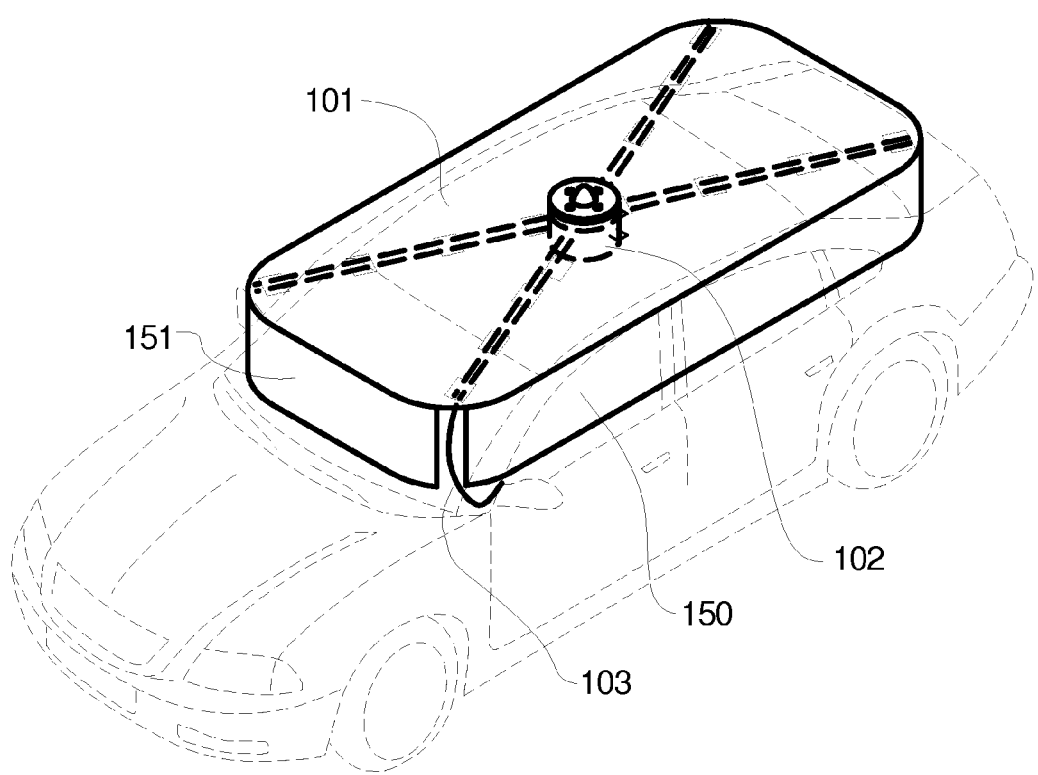
FIG. 1 shows a prospective view of the sun cover assembly when installed on top of a vehicle.

FIG. 1 shows a prospective view of the invention when installed on a vehicle, such as the exemplary car seen in the figure. A sunscreen assembly 101 is attached to the vehicle through the use of a vehicle mounting assembly 102. Vertical side curtains 150, 151 are part of the sunscreen assembly and are attached around the perimeter of the horizontal sunshade. The curtains provide a more complete shade coverage. One end of a security cable 103 is attached to the sunscreen assembly and the other end is locked inside the vehicle to prevent theft.

Figure 2:
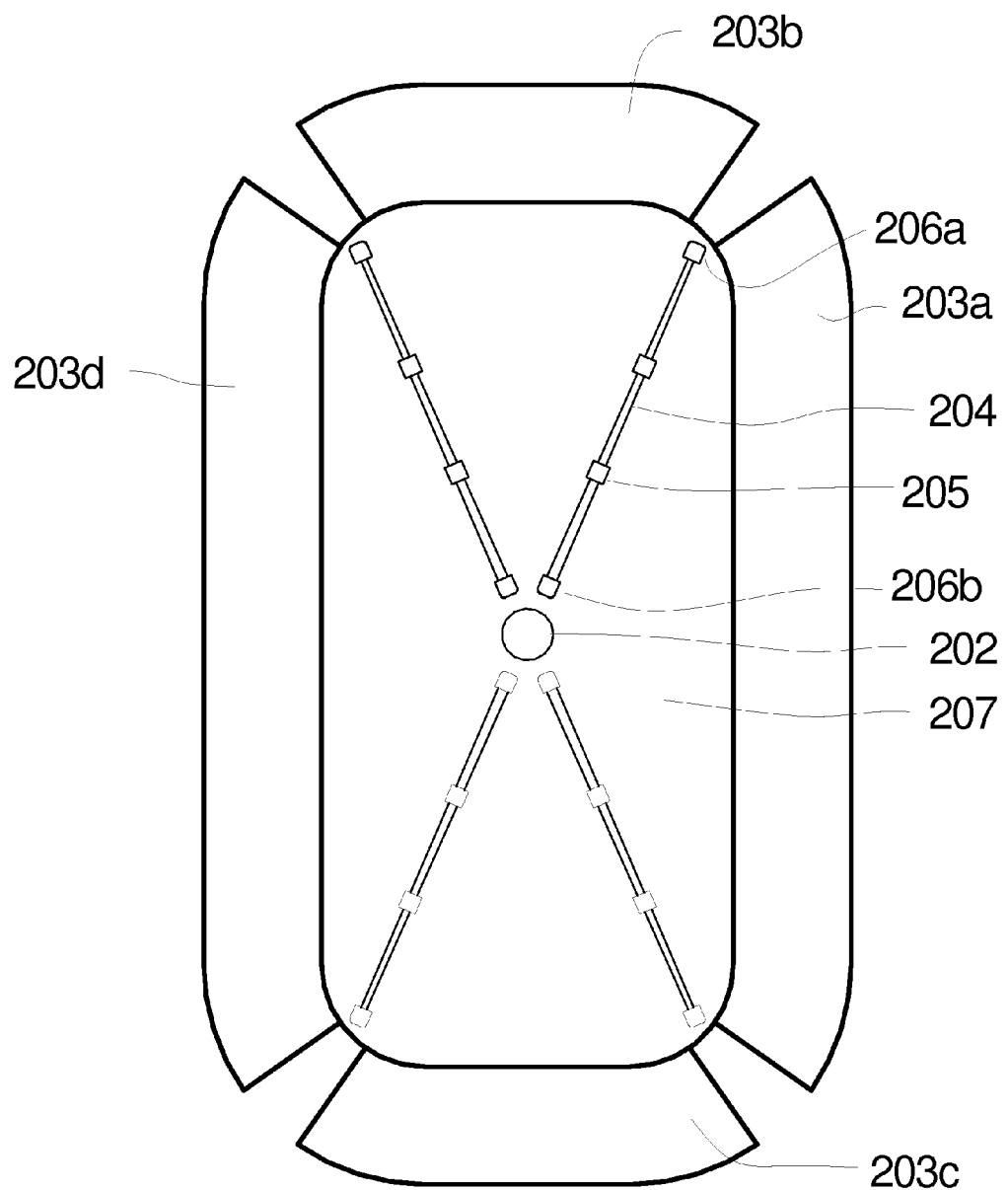
FIG. 2 shows details of the sunscreen assembly.

FIG. 2 shows a bottom view of a flattened, partial sunscreen assembly that is used to provide shade for a vehicle. The exact dimensions of the flattened sunshade will vary depending upon the width and length of the vehicle, and also the height of the windows. In one embodiment, the flattened sunshade is generally rectangular in shape with optionally rounded edges.

The partial sunscreen assembly that is shown comprises a cutout hole 202, various vertical curtains 203a-d, reinforcing ribs 204, rib attachment pockets 205, 206a-b and a horizontal sunshade 207. The vertical curtains are attached to the outer perimeter edge of the horizontal sunshade as shown. The horizontal sunshade 207 and vertical curtains 203a-d are preferably manufactured from a flexible material that is UV resistant and lightweight. The material can be supplied from a variety of industrial and commercial cloths, and preferably incorporates the ability to dissipate heat quickly. The cutout hole is designed to fit inside a pair of snap rings as shown in FIGS. 3A-3B.

The use of a flexible material for the horizontal sunshade and the vertical curtains provides for convenient storage as the sunscreen assembly may be conveniently folded, rolled up, or folded and rolled up. The reinforcing ribs may be telescopic if desired, and this would allow additional ability to fold up and roll the sunscreen into a shorter, more compact space. In one simplified embodiment, the reinforcing ribs are simple plastic boards. In another embodiment, they incorporate a hinge that allows the sunshade to be smaller in length in when stored. In this case, the hinge would have a locking mechanism for use.

Figure 3A:
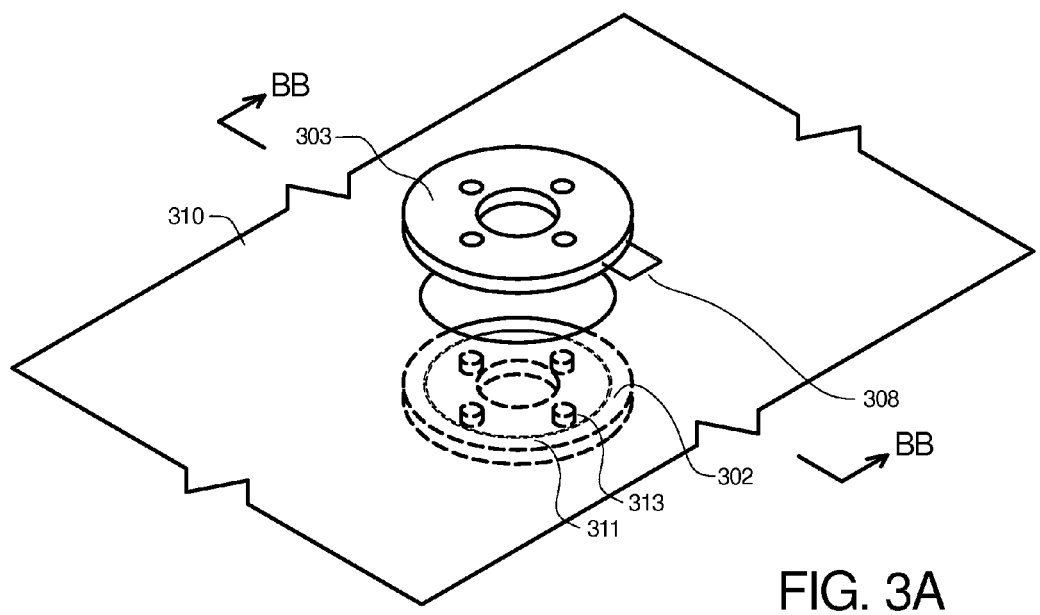
FIGS. 3A-3B show additional details of the sunscreen assembly.

FIG. 3A shows details of a sunscreen clamping/mounting assembly. An upper snap ring 303 and a lower snap ring 302 are used to capture the horizontal sunshade 310. The upper snap ring preferably includes a handle 308. The upper and lower snap ring include four magnets 313a-b for attaching to a vehicle base mounting assembly. This allows the sunscreen assembly to be attached with the lower snap ring or by flipping it over to attach with the upper snap ring. Similarly, in another embodiment, only the lower snap ring includes four magnets 313b for attaching the vehicle base mounting assembly. Alternately, instead of magnets the snap rings include four members that are made from a magnetic material for attaching to the vehicle base mounting assembly via a magnetic force.

Figure 3B:
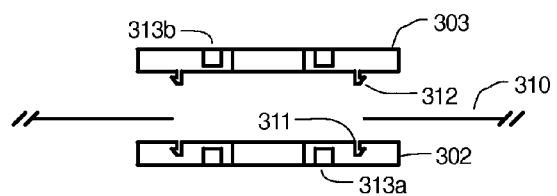

FIG. 3B (view BB of FIG. 3A) shows that the upper snap ring and lower snap ring connect via an insert 312 into a matching insert groove 311. The insert design could be continuous around the upper snap ring, or a plurality of narrow width protruding inserts. The horizontal sunshade 310 has a hole large enough to accommodate the insert method of connecting the upper and lower snap rings. In alternate embodiments, the upper and lower snap rings are connected together by other mechanical methods such as the use of screws, rivets, and threaded parts. A series of snap ring magnets 313 in the lower snap ring are used to engage with the vehicle mounting assembly.

Figure 3C:
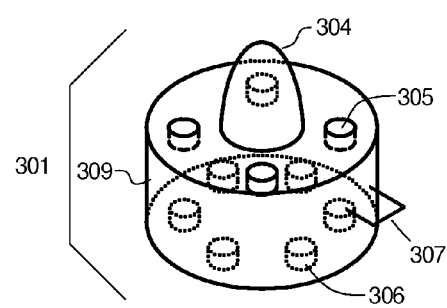
FIG. 3C shows a vehicle mounting assembly.

FIG. 3C shows the vehicle mounting assembly which includes opposite polarity ring magnets 305 in the vehicle mounting base 309 to provide an attaching force. In one embodiment, the vehicle mounting base 309 is conceived as a cylindrical shape and oriented as shown with upper and lower flat surfaces. In other embodiments, it could also be rectangular with two parallel flat surfaces. See FIGS. 5A-B for other embodiments. A plurality of evenly spaced vehicle magnets 306 are mounted in the vehicle mounting base 309 lower flat surface.

It is generally conceived that the snap rings and vehicle mounting assembly are made of plastic, wood, or a non-magnetic metal, except for the magnets.

The horizontal sunshade with curtains and reinforcing rubs is inserted between the upper and lower snap rings, and the two snap rings are then locked together to create a sunscreen assembly. The snap rings are centrally located on the horizontal sunshade. The sunscreen assembly is then attached to the vehicle mounting assembly 301 when in condition of use. This is illustrated in FIG. 1. Two handles, 307, 308 are used to set the vehicle mounting assembly 301 on top of the vehicle, and also put the clamping ring on top of the sunscreen to secure it to the vehicle. The use of handles is not a strict requirement.

The sunscreen assembly will be securely installed on top of the vehicle mounting assembly by action of opposite polarity magnets 313, 305. The sunscreen assembly is centered on the vehicle mounting base 309 by using the centering spike 304. To remove the sunscreen assembly, the snap rings are easily rotated 20 to 45 degrees to disengage the opposite polarity magnets. The sunscreen assembly is then removed from the top of the vehicle mounting assembly.

It is conceived in an embodiment of the invention that the vehicle mounting assembly will remain on top of the vehicle when the vehicle is in motion, and magnets with sufficient attaching strength are used so that it be securely attached to the top of the vehicle during a variety of low speed driving conditions, such as a parking lot. However, this is only one embodiment. In another embodiment, the vehicle operator removes the vehicle mounting assembly, if desired, by using the handle to tip it up and lift it off.

Figure 4:
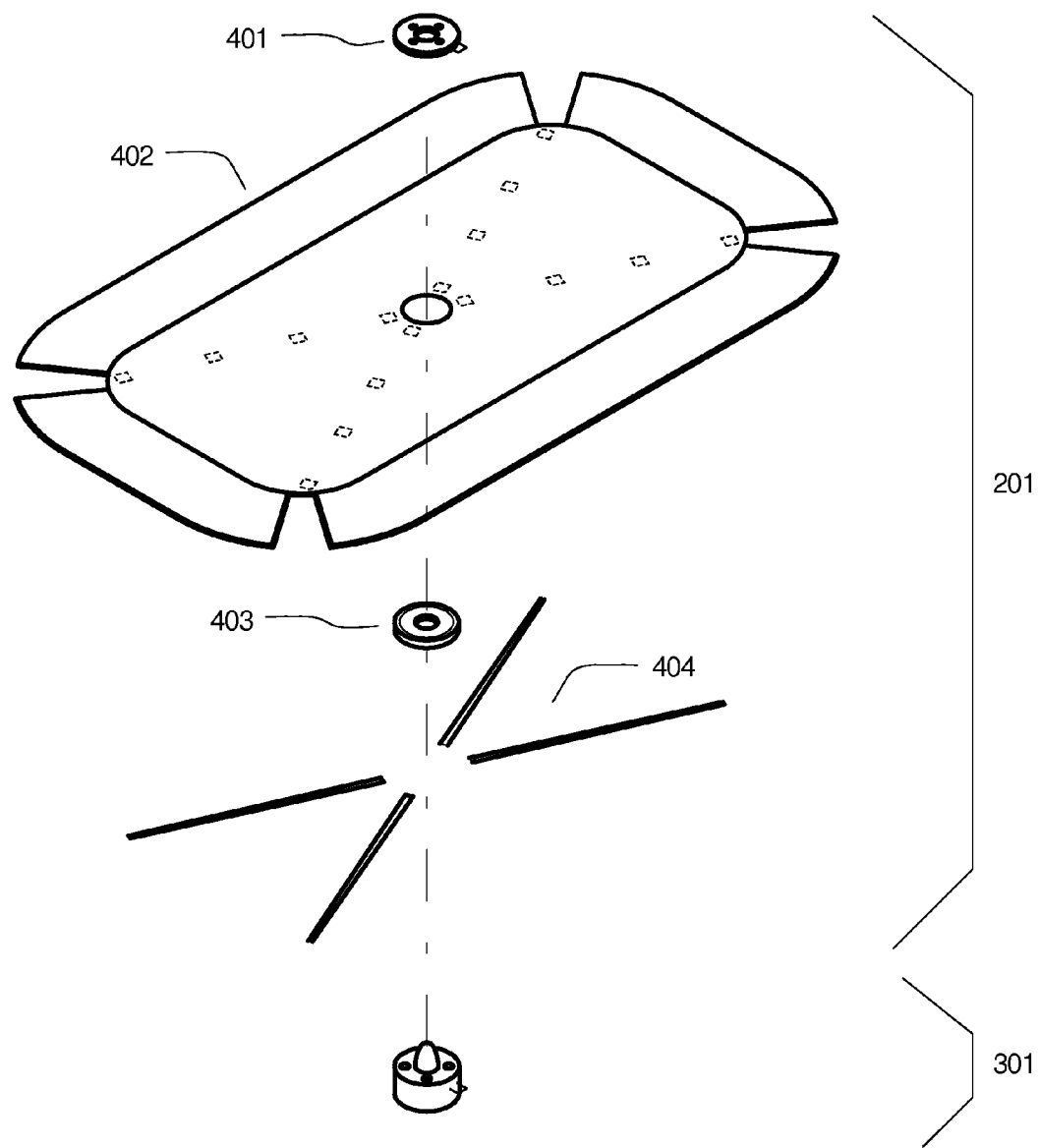
FIG. 4 shows an exploded view of the vehicle sun cover assembly.

FIG. 4 shows an exploded view of the sun cover assembly. The sunscreen assembly 201 and the vehicle mounting assembly 301 are shown. An upper snap ring 401, a horizontal sunshade with attached curtains 402, stiffening ribs 404, a lower snap ring 403, and the vehicle mounting assembly 301 are shown. The sunscreen assembly 201 is shown in exploded form, but the vehicle mounting assembly 301 is not.

Figures 5A, 5B:
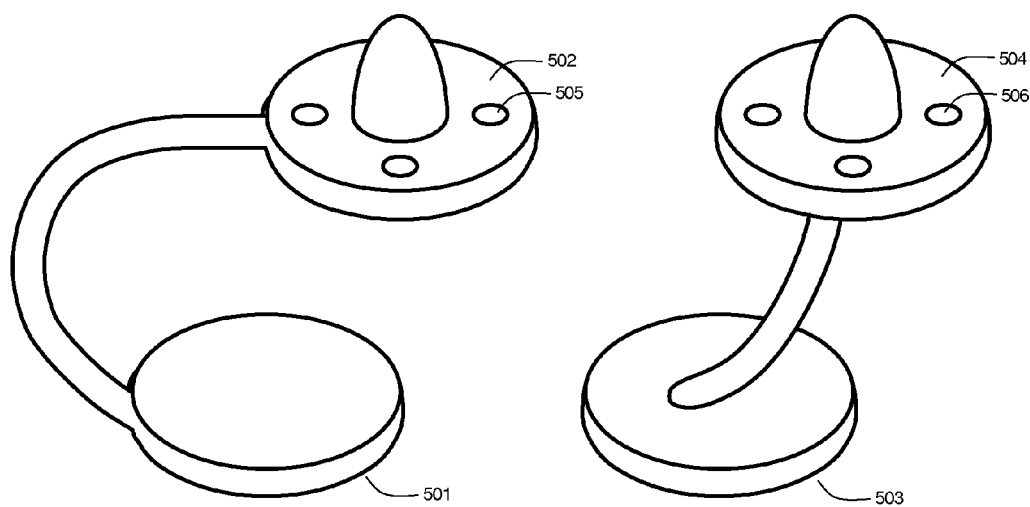
FIGS. 5A-5B show additional embodied vehicle mounting assemblies with improved aesthetic appeal.

FIGS. 5A-5B show alternate embodied vehicle mounting assemblies. The vehicle mounting magnets are mounted in the lower flat surface on the very bottom of the mounting base 501, 503. The magnets can either protrude from the bottom flat surface or be flush with it. Similarly, ring magnets 505, 506 are mounted on the upper flat surface 502, 504 of the vehicle mounting base. The ring magnets can either protrude from the top flat surface or be flush with it.

Figure 6:
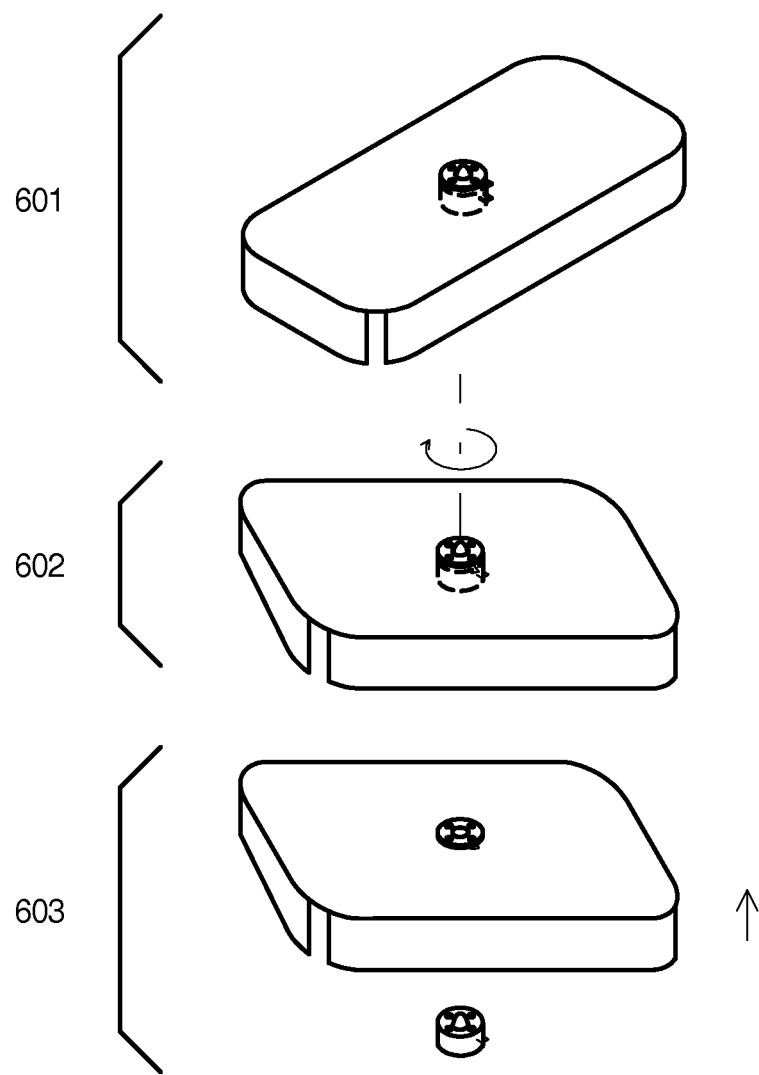
FIG. 6 is an example of how the sunscreen assembly is removed from the vehicle mounting assembly by rotating and lifting.

FIG. 6 shows the method of removing the sunscreen assembly from the vehicle mounting assembly. In the top step 601, the sunscreen assembly is mounted on the vehicle mounting assembly. In the middle step 602, the sunscreen assembly is partially rotated, such as 20 to 90 degrees to release the magnets. In the bottom step 603, the sunscreen assembly is lifted off of the vehicle mounting assembly.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. An external vehicle sun cover assembly comprising:
   A. a sunscreen assembly comprising:
      1) a horizontal sunshade,
      2) a plurality of vertical curtains, wherein said vertical curtains are attached to an outer perimeter edge of said horizontal sunshade,
      3) a plurality of reinforcing ribs,
      4) a plurality of rib attachment pockets, wherein said rib attachment pockets are used to attach said reinforcing ribs to said horizontal sunshade,
      5) an upper snap ring and a lower snap ring, wherein said snap rings are connected together about their cylindrical axis by use of an insert and matching groove,
      6) wherein said upper snap ring and said lower snap ring capture said horizontal sunshade when connected together,
      7) wherein said upper snap ring and said lower snap ring are disposed to be centrally located in said horizontal sunshade,
      8) wherein a plurality of snap ring magnets are incorporated into said lower snap ring and into said upper snap ring, and
      9) wherein said snap ring magnets are oriented so as to be dispersed substantially evenly in a defined pattern, and
   B. a vehicle mounting assembly comprising:
      1) a vehicle mounting base, wherein said vehicle mounting base incorporates a lower flat surface and an upper flat surface,
      2) a plurality of vehicle magnets mounted in the lower flat surface of said vehicle mounting base,
      3) a plurality of ring magnets mounted in the upper flat surface of said vehicle mounting base, wherein said ring magnets are oriented so as to be dispersed substantially evenly in said defined pattern, and
      4) a centering spike that is mounted in the upper flat surface of said vehicle mounting base,
   C. wherein said vehicle sunscreen assembly and said vehicle mounting assembly are magnetically joined together to provide shade for a vehicle, and
   D. wherein said vehicle mounting assembly is attachable to either said upper snap ring or said lower snap ring.

2. The external vehicle sun cover assembly according to claim 1 wherein a security cable is attached to said horizontal sunshade.

3. The external vehicle sun cover assembly according to claim 1 wherein said sunscreen assembly is separable from said vehicle mounting assembly by rotating said sunscreen assembly 20-90 degrees relative to said vehicle mounting assembly.

* * * * *